United States Patent
Ikeda et al.

(10) Patent No.: US 7,524,084 B2
(45) Date of Patent: Apr. 28, 2009

(54) ILLUMINATING DEVICE, AND PROJECTION TYPE VIDEO DISPLAY

(75) Inventors: Takashi Ikeda, Osaka (JP); Hideyuki Kanayama, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 336 days.

(21) Appl. No.: 11/091,482

(22) Filed: Mar. 29, 2005

(65) Prior Publication Data

US 2005/0219841 A1 Oct. 6, 2005

(30) Foreign Application Priority Data

Mar. 30, 2004 (JP) .............................. 2004-101326
Dec. 24, 2004 (JP) .............................. 2004-373987

(51) Int. Cl.
*F21V 9/00* (2006.01)
(52) U.S. Cl. ................... 362/231; 362/230; 362/235; 362/293; 362/294; 362/373; 362/547; 359/457; 353/30; 353/32
(58) Field of Classification Search ................. 362/230, 362/231, 235, 293, 294, 373, 547; 359/457; 353/30, 32; 361/688
See application file for complete search history.

(56) References Cited

U.S. PATENT DOCUMENTS

| | | | | |
|---|---|---|---|---|
| 2001/0013924 | A1* | 8/2001 | Yokoyama et al. | 353/52 |
| 2003/0072153 | A1* | 4/2003 | Matsui et al. | 362/231 |
| 2005/0190562 | A1* | 9/2005 | Keuper et al. | 362/325 |
| 2005/0201107 | A1* | 9/2005 | Seki | 362/373 |
| 2005/0213055 | A1* | 9/2005 | Yokote et al. | 353/99 |

FOREIGN PATENT DOCUMENTS

| | | |
|---|---|---|
| JP | 07-110460 | 4/1995 |
| JP | 2000-056410 | 2/2000 |
| JP | 2000-275732 | 10/2000 |
| JP | 2000-321671 | 11/2000 |

(Continued)

OTHER PUBLICATIONS

Japanese Office Action issued in Japanese Patent Application No. JP 2004-101326, mailed Sep. 11, 2007.
Japanese Office Action issued in Japanese Patent Application No. JP 2004-101326, mailed Dec. 18, 2007.

(Continued)

*Primary Examiner*—Sandra L. O'Shea
*Assistant Examiner*—Meghan K. Dunwiddie
(74) *Attorney, Agent, or Firm*—McDermott Will & Emery LLP

(57) ABSTRACT

Three light sources are provided as a light source. A first light source emits a light in red, a second light source emits a light in green, and a third light source emits a light in blue. Each light source is a light source in which a plurality of LEDs (light-emitting diodes) are arranged in the same plane surface. The first light source, the second light source, and the third light source are arranged on the same plane surface. Furthermore, lines connecting the first light source, the second light source, and the third light source form a triangle. Light fluxes (primary optical axes) of each light source are parallel with each other. The first light source, the second light source, and the third light source are arranged on one piece of a cooling plate.

10 Claims, 4 Drawing Sheets

FOREIGN PATENT DOCUMENTS

| | | |
|---|---|---|
| JP | 2002-189263 | 7/2002 |
| JP | 2002-228973 | 8/2002 |
| JP | 2003-177353 | 6/2003 |
| JP | 2003-330110 | 11/2003 |
| WO | WO/98/13725 | 4/1998 |

OTHER PUBLICATIONS

Japanese Office Action issued in Japanese Patent Application No. JP 2004-373987, mailed Dec. 18, 2007.

Japanese Office Action issued in Japanese Patent Application No. JP 20004-373987, dated on Mar. 18, 2008.

* cited by examiner

ILLUMINATING DEVICE, AND PROJECTION TYPE VIDEO DISPLAY

BACKGROUND OF THE INVENTION

Field of the Invention

The present invention relates to an illuminating device, and a projection type video display. In FIG. 4, a conventional projection type video display (liquid crystal projector) is shown. A light-emitting portion 2 of a light source 1 is formed of an ultra-high pressure mercury lamp, a metal halide lamp, a xenon lamp, and others, and an irradiating light of the light source 1, which is rendered a parallel light by a parabolic reflector 3, is emitted and introduced into an integrator lens 4.

The integrator lens 4 is constituted of one pair of fly's eye lenses 4a, 4b, and each lens-pair is to introduce a light emitted from the light source 1 to an entire surface of a liquid crystal light valve described later. The light via the integrator lens 4, after via a polarization conversion system 5, and a condenser lens 6, is introduced into a dichroic mirror 8.

The polarization conversion system 5 is constituted of a polarizing beam splitter array (Hereinafter, referred to as a PBS array). The PBS array is provided with a polarized light separating surface and a retardation plate (½ λ plate). Each polarized light separating surface of the PBS array transmits a P-polarized light, for example, out of lights from the integrator lens 4, and changes an optical path of an S-polarized light by 90 degrees. The S-polarized light having the optical path changed is reflected by an adjacent polarized light separating surface, converted into the P-polarized light by the retardation plate provided on a front side (light-emission side) of the retardation plate, and emitted therefrom. On the other hand, the P-polarized light that passes through the polarized light separating surface is emitted as it is. That is, in this case, approximately all the lights are converted into the P-polarized light. In the above-described example, descriptions are made regarding a configuration in which all the lights are converted into the P-polarized light. However, it may be possible to configure such that all the lights are converted into the S-polarized light by providing a retardation plate location in a P-polarized light-emission location.

The dichroic mirror 8 transmits a light in a red wavelength band, and reflects a light in a cyan (green+blue) wavelength band. The light in a red wavelength band that passes through the dichroic mirror 8 is reflected by a reflection mirror 9, and thereby, an optical path is changed. The light in red reflected by the reflection mirror 9 passes through a transmission type liquid crystal light valve 7R for red light via a condenser lens 10, and thereby, the light in red is optically modulated. On the other hand, the light in a cyan wavelength band reflected by the dichroic mirror 8 is introduced into a dichroic mirror 11.

The dichroic mirror 11 transmits a light in a blue wavelength band, and reflects a light in a green wavelength band. The light in a green wavelength band reflected by the dichroic mirror 11, via a condenser lens 12, is introduced into a transmission type liquid crystal light valve 7G for green light, and as a result of passing through the light valve 7G, is optically modulated. In addition, the light in a blue wavelength that passes through the dichroic mirror 11, via a relay lens 13, a reflection mirror 14, a relay lens 15, a reflection mirror 16, and a condenser lens 17, is introduced into a transmission type liquid crystal light valve 7B for blue light, and as a result of passing through the light valve 7B, is optically modulated.

The modulated lights (image lights in respective colors) modulated as a result of passing through the liquid crystal display panels 7R, 7G, and 7B are combined by a dichroic prism 18, and rendered a color image light. The color image light is projected by a projection lens 19, and displayed on a screen.

In addition, as a conventional projection type video display, there is proposed a configuration in which each of the light in red from the LED in red, the light in green from the LED in green, and the light in blue from the LED in blue is introduced into the same direction, using a cross dichroic prism (Japanese Patent Laying-open No. 2002-189263).

SUMMARY OF THE INVENTION

However, in the above configuration shown in FIG. 4, it is needed a color separating system for separating a light in white into three primary colors. Furthermore, the configuration according to the above-described reference is a single-panel configuration, and is not a three-panel type configuration in which a reduction in size is realized. In addition, in the configuration according to the above-described reference, it is not easy to effectively perform a cooling of a light source, and others.

In view of the above circumstance, it is an object of the present invention to provide an illuminating device and a projection type video display capable of reducing in size, and increasing a cooling efficiency of a light source.

In an illuminating device that generates lights in three primary colors, in order to solve the above-described problem, an illuminating device of the present invention comprises a solid light source for emitting a first color light, a solid light source for emitting a second color light, and a solid light source for emitting a third color light, and primary optical axes of these three solid light sources are parallel with each other, and the solid light sources are arranged on the same plane surface in such a manner that lines connecting the light sources form a triangle.

With the above-described configuration, the three solid light sources are arranged on the same plane surface in such a manner that lines connecting the light sources form a triangle so that it is possible to reduce the illuminating device in size. In addition, as described later, it is advantageous to easily obtain structure in which a cooling efficiency is increased.

In the illuminating device of the above configuration, the solid light source may be formed of one or a plurality of solid light-emitting elements.

In addition, in the illuminating device of these configurations, the three solid light sources are preferably arranged on a single cooling plate. In the configuration using the single cooling plate like this, it is possible to prevent the device from growing in size, and at the same time, to increase a cooling efficiency of the light source. Furthermore, it is easy to implement a reduction in cost. At a lower surface of the cooling plate, a fin is preferably formed.

Furthermore, in the illuminating device of these configurations, a wind generator for cooling at least the solid light sources may be provided. It is noted that in the present invention, the wind generator includes a centrifugal fan, an axial fan, a blower, and a device that does not have a blade and yet generates a wind. In addition, in the illuminating device of these configurations, it may be possible that the three solid light sources are provided on a single cooling plate, and the wind generator is arranged in such a manner that an airflow contacts the cooling plate. In such the configuration, the cooling plate is formed with a fin and the airflow may contact the fin.

Furthermore, in the illuminating device of these configurations, a wind generator may be provided in such a manner as to be surrounded by the three solid light sources. In addition, in the illuminating device of these configurations, it may be configured such that the three solid light sources are arranged in a single cooling plate, a wind generator is arranged in such a manner as to be surrounded by the three solid light sources, and air taken in by the wind generator is blown to the cooling plate. In addition, in the illuminating device of these configurations, it may be possible that the three solid light sources are arranged on a single cooling plate, a wind generator is arranged in such a manner as to be surrounded by the three solid light sources, and the wind generator takes in air from one surface side of the cooling plate and blows the air to the other surface side thereof.

In addition, a projection type video display of the present invention comprises the above-described illuminating device, an optical system for introducing to light valves each light in respective colors from each solid light source of the illuminating device, and an image light combining means for combining image lights in respective colors obtained as a result of passing through the light valves. The image light combining means has a cuboid shape, and the light valves are arranged to be faced with three side surfaces out of four side surfaces of the cuboid shape.

Furthermore, a projection type video display of the present invention comprises the illuminating device provided with the above-described wind generator, an optical system for introducing to light valves each light in respective colors from each solid light source of the illuminating device, and an image light combining means for combining image lights in respective colors obtained as a result of passing through said light valves, and the image light combining means has a cuboid shape, the light valves are arranged to be faced with three side surfaces out of four side surfaces of the cuboid shape, and the wind generator is arranged in such a manner as to take in air from a side of the image light combining means.

With the projection type video display of these configurations, the wind generator takes in air from a side of the image light combining means so that the airflow by this taking-in draws heat from the light valves, thus enabling to implement a cooling of the light valves.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Below, an illuminating device and a projection type video display of an embodiment of the present invention will be described based on FIG. 1 to FIG. 3.

Figure 1:
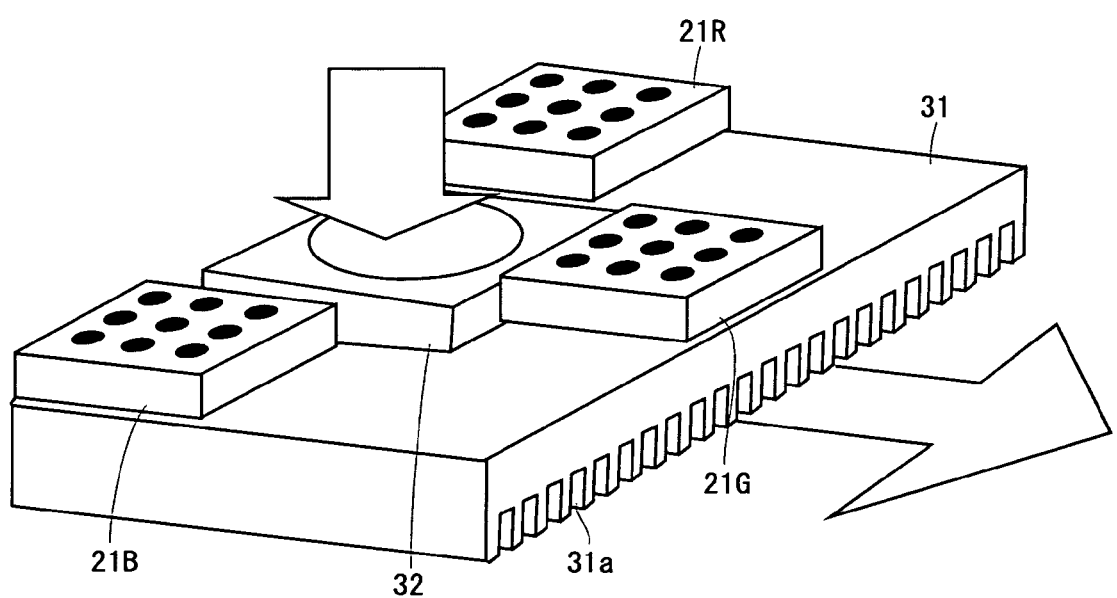
FIG. 1 is a perspective view of an illuminating device of an embodiment of the present invention.

As shown in FIG. 1, as a light source, the illuminating device is provided with three LED light sources 21R, 21G, and 21B (Hereinafter, a numeral "21" is used when showing not specifying each LED light source). The LED light source 21R emits a light in red, the LED light source 21G emits a light in green, and the LED light source 21B emits a light in blue.

LED light source 21 is a light source in which a plurality of LEDs (light-emitting diodes) are arranged on the same plane surface in an arraying manner, and has a plane shape. Emission-light axes (primary optical axes) of each LED are perpendicular to the plane surface (LED arranging plane surface). In addition, the LED light source 21 may be formed in a rectangular shape having a vertical and horizontal ratio equal to or approximately equal to an aspect ratio of a liquid crystal display panel 23 described later.

The LED light source 21R, the LED light source 21G, and the LED light source 21B are arranged on the same plane surface. That is, light-emission surfaces of each light source exist on the same plane surface. Furthermore, lines connecting a center of the LED light source 21R, a center of the LED light source 21G, and a center of the LED light source 21B form a triangle. Light fluxes (primary optical axes) of each light source are parallel with each other.

The LED light source 21R, the LED light source 21C, and the LED light source 21B are arranged on an even surface (upper surface) of one piece of a cooling metal plate 31. At a lower surface of the cooling metal plate 31, fins 31a are formed. In addition, in a space surrounded by the LED light source 21R, the LED light source 21G, and the LED light source 21B, a sirocco fan (wind generator) 32—use through-hole for attachment is formed, and in this through-hole for attachment, the sirocco fan 32 is incorporated. The sirocco fan takes in air from above. An air supply port of the sirocco fan 32 exists in such a manner as to face toward a lateral side at a lower side of the cooling metal plate 31. In addition, the air supply port is placed vertically toward an aligning direction of the fins 31a, an airflow from the air supply port passes along the fins 31a, and draws heat from the cooling metal plate 31 to be exhausted to outside.

Figure 2:
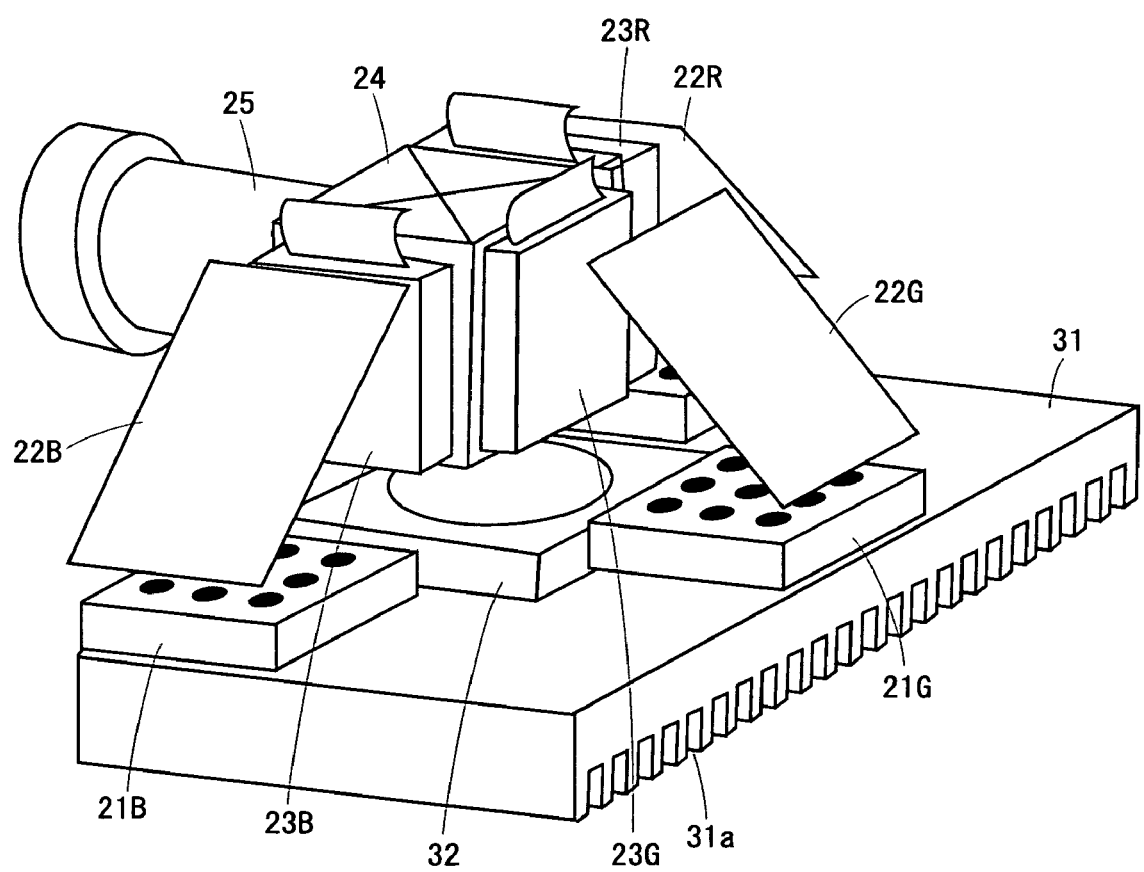
FIG. 2 is a perspective view showing a projection type video display using the illuminating device in FIG. 1.

FIG. 2 is a perspective view showing a projection type video display using the illuminating device in FIG. 1. A width of the light fluxes of the LED light source 21R, 21C and 21B is approximately the same as a width of a cross dichroic prism 24 (or a width of the liquid crystal display panel).

A mirror 22R, on a light-emission side of the LED light source 21R, is arranged to be inclined at 45 degrees toward an emission-light axis of the LED light source 21R, and, on a light-incidence side of a transmission type liquid crystal display panel 23R for red light, to be inclined at 45 degrees toward an incidence-light axis of the liquid crystal display panel 23R. That is, the light in red emitted from the LED light source 21R is reflected by the mirror 22R, and incident on the liquid crystal display panel 23R.

A mirror 22G, on a light-emission side of the LED light source 21G, is arranged to be inclined at 45 degrees toward an emission-light axis of the LED light source 21G, and, on a light-incidence side of a transmission type liquid crystal display panel 23G for green light, to be inclined at 45 degrees toward an incidence-light axis of the liquid crystal display panel 23G. That is, the light in green emitted from the LED light source 21G is reflected by the mirror 22G, and incident on the liquid crystal display panel 23G.

A mirror 22B, on a light-emission side of the LED light source 21B, is arranged to be inclined at 45 degrees toward an emission-light axis of the LED light source 21B, and on an light-incidence side of a transmission type liquid crystal display panel 23B for blue light, to be inclined at 45 degrees toward an incidence-light axis of the liquid crystal display panel 23B. That is, the light in blue emitted from the LED light source 21B is reflected by the mirror 22B, and incident on the liquid crystal display panel 23B.

Each liquid crystal display panel 23R, 23G, and 23B is formed of being provided with an incidence-side polarizing plate, a panel portion formed by sealing a liquid crystal between a pair of glass plates (in which a pixel electrode and an alignment film are formed), and an emission-side polarizing plate. The liquid crystal display panels 23R, 23G, and 23B are arranged to be faced with light incidence surfaces (three side surfaces out of four side surfaces) of the cross dichroic prism 24 that forms the cuboid shape. In addition, the cross dichroic prism 24 is placed above the sirocco fan 32, and arranged in such a manner as to allow intervals (a gap) to absorb air of the sirocco fan 32. Modulated lights (image lights in respective colors) modulated by passing through the liquid crystal display panels 23R, 23G, and 23B are combined by the cross dichroic prism 24, rendered a color image light, and emitted from the light-emission surface (the surface other than the three side surfaces out of the four side surfaces) of the cross dichroic prism 24. The color image light is enlarged and projected by a projection lens 25, and is displayed on a screen.

As described above, the three LED light sources 21R, 21G, and 21B are arranged on the same plane surface in such a manner that the lines connecting the three LED light sources form a triangle, thus possible to implement to reduce the illuminating device in size and the projection type video display in size. Furthermore, the three LED light sources 21R, 21G, and 21B are arranged on the even surface of the single cooling metal plate 31, thus possible to prevent the illuminating device from growing in size, and to increase a cooling efficiency of the LED light sources 21R, 21G, and 21B.

In addition, the sirocco fan 32 is arranged on the cooling metal plate 31 in such a manner as to be surrounded by the three LED light sources 21R, 21G, and 21B, and a space surrounded by the three LED light sources 21R, 21G, and 21B is effectively used, thus possible to realize compact cooling structure.

Furthermore, the air taken in by the sirocco fan 32 is configured to be blown along the fins 31a so that it is possible to efficiently draw heat from the cooling metal plate 31. In addition, the sirocco fan 32 is arranged in such a manner as to take in the air from a side of the dichroic prism 24 so that an airflow by this taking-in draws the heat from the liquid crystal display panels 23R, 23G and 23B, thereby implementing a cooling of the liquid crystal display panels 23R, 23G, and 23B. It is noted that the fins 31a are not necessarily aligned horizontally (linearly), and may be formed in a circular arc shape in such a manner that a wind blows to a direction of the LED light sources 21R, 21B, for example.

In stead of the cooling metal plate 31, it may be structured that the LED light sources 21R, 21G, and 21B are arranged on a liquid-cooling thermal conductive plate, and that cooling-use liquid is passed in this liquid-cooling thermal conductive plate. Furthermore, in this case, it may be structured that the cooling-use liquid is introduced to a heat radiating portion (radiator) not shown, and the cooling-use liquid cooled by the heat radiating portion is returned (circulated) to the thermal conductive plate. The heat radiating portion is preferably provided with fins. In a case of adopting such a liquid cooling method, the sirocco fan 32 is not necessarily needed, and however, the sirocco fan 32 may be retained for cooling the liquid crystal display panel 23.

In addition, in the above-described configuration, the airflow by the sirocco fan 32 is passed on a fins 31a side. However, this is not always the case, and it may be possible that a branch duct (provided with three small air supply ports) is provided in the air supply port of the sirocco fan 32, and the airflow blown from the small air supply port of the branch duct is introduced to each of the LED light sources 21R, 21G, and 21B. In such the configuration, the cooling metal plate 31 is not necessarily needed.

In addition, the configuration of the present invention is not limited to an arranging configuration shown in FIG. 1, and it may be possible, too, to adopt the arranging configuration in which an upper and lower relationship is reversed (a configuration of FIG. 3 described below). In addition, the solid light source is not limited to the LED light source, and another solid light-emitting element may be used. Furthermore, each solid light source may be constituted of one solid light-emitting element. In addition, an axial flow fan, and others may be provided in stead of the sirocco fan 32.

Figure 3:
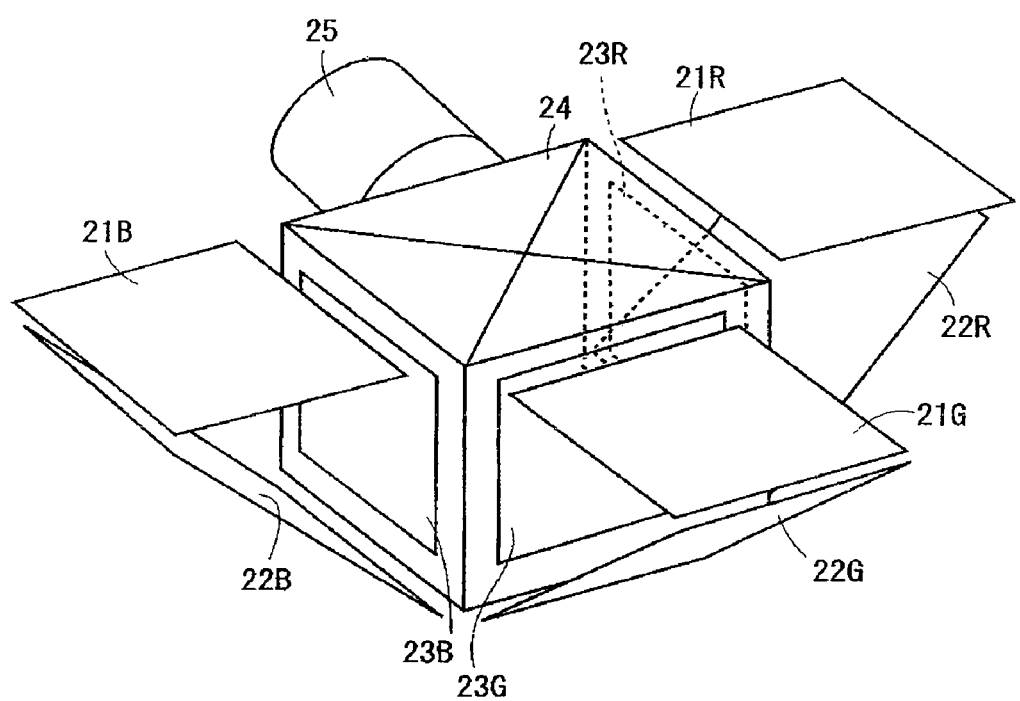
FIG. 3 is a perspective view showing a projection type video display of another embodiment of the present invention.

FIG. 3 is a perspective view showing a three-panel projection type video display of another embodiment. For the sake of illustration, the same numeral is allotted to the same optical member as the optical member shown in FIG. 2. The projection type video display is provided with the three LED light sources 21R, 21G, and 21B as the light source. The LED light source 21R, the LED light source 21G, and the LED light source 21B are arranged on the same plane surface. That is, light-emission surfaces of each light source exist on the same plane surface. In addition, lines connecting the center of the LED light source 21R, the center of the LED light source 21G, and the center of the LED light source 21B form a triangle. The light fluxes (primary optical axes) of each light source are parallel with each other. The LED light source 21R brings an edge thereof closer to a vicinity of an upper edge of a panel surface of the liquid crystal display panel 23R, and is provided vertically toward the panel surface. The LED light source 21G brings an edge thereof closer to an upper edge of the panel surface of the liquid crystal display panel 23G, and is provided vertically toward a panel surface. The LED light source 21B brings an edge thereof closer to an upper edge of a panel surface of the liquid crystal display panel 23B, and is provided vertically toward the panel surface. These LED light sources 21R and 21G are arranged in such a manner that the edges are brought close to each other on the same plane surface, and the LED light source 21G and the LED light source 21B are arranged in such a manner that the edges are bought close to each other on the same plane surface. A width of the light fluxes of the LED light sources 21R, 21G, and 21B is approximately the same as a width of the cross dichroic prism 24 (or a width of the liquid crystal display panel).

The mirror 22R, on the light-emission side of the LED light source 21R, is arranged to be inclined at 45 degrees toward the emission-light axis of the LED light source 21R, and on the light-incidence side of the liquid crystal display panel 23R, to be inclined at 45 degrees toward the incidence-light axis of the liquid crystal display panel 23R. That is, the light in red emitted from the LED light source 21R is reflected by the mirror 22R, and incident on the liquid crystal display panel 23R.

The mirror 22R, on the light-emission side of the LED light source 21G, is arranged to be inclined at 45 degrees toward the emission-light axis of the LED light source 21G, and on the light-incidence side of the liquid crystal display panel 23G, to be inclined at 45 degrees toward the incidence-light axis of the liquid crystal display panel 23G. That is, the light in green emitted from the LED light source 21G is reflected by the mirror 22G, and incident on the liquid crystal display panel 23G.

The mirror 22B, on the light-emission side of the LED light source 21B, is arranged to be inclined at 45 degrees toward the emission-light axis of the LED light source 21B, and on the light-incidence side of the liquid crystal display panel 23B, is arranged to be inclined at 45 degrees toward the incidence-light axis of the liquid crystal display panel 23B. That is, the light in blue emitted from the LED light source 21B is reflected by the mirror 22B, and incident on the liquid crystal display panel 23B.

Figure 4:
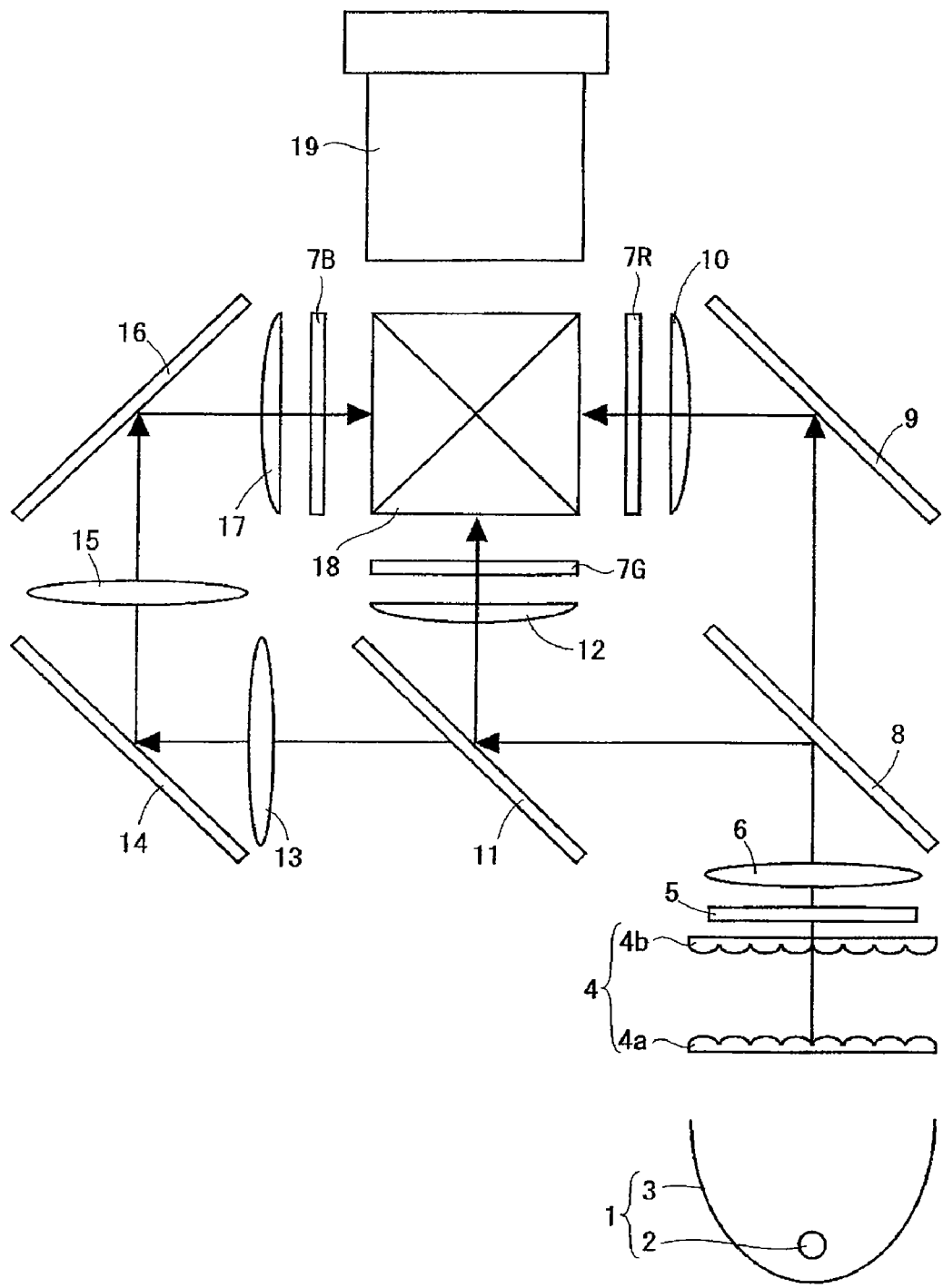
FIG. 4 is a descriptive diagram showing a conventional projection type video display.

In the above-described configurations of FIG. 2 and FIG. 3, it may be possible to adopt a configuration in which the liquid crystal display panel 23 is detached, and reflection type video display panels are arranged in an arranging location of the mirrors 22R, 22G, and 22B, for example. Furthermore, it is possible to provide a light integrator such as an integrator lens (see FIG. 4) formed of one pair of fly's eye lenses (a light-incidence side fly's eye lens, and a light-emission side fly's eye lens) on the optical path from each LED light source 21 to the video display panel). It is noted that the mirrors 22R, 22G, and 22B are formed with a plurality of concave surface mirror portions, and thereby allowing the mirrors 22R, 22G, and 22B to have a function of the light-incidence side fly's eye lens.

Furthermore, it is also possible to provide, as required, a polarization conversion system (see FIG. 4) on the optical path from each LED light source 21 to the video display panel. The polarization conversion system is not limited to the structure shown in FIG. 4, and it is possible to adopt structure formed of a plate-shaped wire grid polarizing beam splitter, and a mirror (this reflection mirror is arranged in parallel with the polarizing beam splitter) that reflects the light (S-polarized light) reflected by the polarizing beam splitter. It is possible to arrange the polarization conversion system of such the structure in such a manner as to be brought close to the LED light source 21.

Instead of the mirrors 22R, 22G, and 22B, it is possible to use a prism. In addition, by providing a mirror on side surfaces of the mirrors 22R, 22G, and 22B, or the prism, it becomes possible to shield a leaked light and efficiently use the light. Furthermore, in the configuration shown in FIG. 3, the LED light source 21 is provided to be flush with an upper surface of the cross dichroic prism 24, and however, the LED light source 21 may be arranged on a upper side than the upper surface of the cross dichroic prism 24.

As described above, according to the present invention, the three solid light source are arranged on the same plane surface in such a manner that lines connecting the solid light sources form a triangle so that it is possible to implement to reduce the illuminating device and the projection type video display in size. In addition, it is possible to obtain advantages of obtaining an increased cooling efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illuminating device that generates a light in three primary colors, comprising:
   a solid light source for emitting a first color light;
   a solid light source for emitting a second color light;
   a solid light source for emitting a third color light, and
   a wind generator for cooling at least said solid light sources, wherein
   primary optical axes of these three solid light sources are parallel with each other, and
   said solid light sources are arranged on the same plane surface in such a manner that lines connecting the light sources form a triangle.

2. An illuminating device that generates a light in three primary colors, comprising:
   a solid light source for emitting a first color light;
   a solid light source for emitting a second color light; and
   a solid light source for emitting a third color light, wherein
   primary optical axes of these three solid light sources are parallel with each other,
   said solid light sources are arranged on the same plane surface in such a manner that lines connecting the light sources form a triangle,
   said three solid light source are arranged on a single cooling plate, and
   a wind generator is arranged in such a manner that an airflow to be blown to said cooling plate.

3. An illuminating device according to claim 2, wherein said cooling plate is formed with fins, and said airflow contacts said fins.

4. An illuminating device that generates a light in three primary colors, comprising:
   a solid light source for emitting a first color light;
   a solid light source for emitting a second color light; and
   a solid light source for emitting a third color light, wherein
   primary optical axes of these three solid light sources are parallel with each other,
   said solid light sources are arranged on the same plane surface in such a manner that lines connecting the light sources form a triangle, and
   a wind generator is arranged in such a manner as to be surrounded by said three solid light sources.

5. An illuminating device that generates a light in three primary colors, comprising:
   a solid light source for emitting a first color light;
   a solid light source for emitting a second color light; and
   a solid light source for emitting a third color light, wherein
   primary optical axes of these three solid light sources are parallel with each other,
   said solid light sources are arranged on the same plane surface in such a manner that lines connecting the light sources form a triangle,
   said three solid light sources are arranged on a single cooling plate,
   a wind generator is arranged in such a manner as to be surrounded by said three solid light sources, and
   air taken in by said wind generator is blown to said cooling plate.

6. An illuminating device that generates a light in three primary colors, comprising:
   a solid light source for emitting a first color light;
   a solid light source for emitting a second color light; and
   a solid light source for emitting a third color light, wherein
   primary optical axes of these three solid light sources are parallel with each other,
   said solid light sources are arranged on the same plane surface in such a manner that lines connecting the light sources form a triangle,
   said three solid light sources are arranged on a single cooling plate,
   a wind generator is arranged in such a manner as to be surrounded by said three solid light sources, and
   said wind generator takes in air from one surface side of said cooling plate and blows the air to the other surface side.

7. A projection type video display, comprising:
   the illuminating device according to any one of claims 1 to 6;
   an optical system for introducing to light valves each light in respective colors from each solid light source of said illuminating device; and an image light combining means for combining image lights in respective colors obtained as a result of passing through said light valves, wherein said image light combining means has a cuboid shape, and said light valves are arranged to be faced with three side surfaces out of four side surfaces of the cuboid shape.

8. A projection type video display, comprising:

the illuminating device according to any one of claims 4 to 6;

an optical system for introducing to light valves each light in respective colors from each solid light source of said illuminating device; and an image light combining means for combining image lights in respective colors obtained as a result of passing through said light valves, wherein said image light combining means has a cuboid shape, said light valves are arranged to be faced with three side surfaces out of four side surfaces of the cuboid shape, and said wind generator is arranged in such a manner as to take in air from a side of said image light combining means.

9. A projection type video display, comprising:

an illuminating device comprising:

a solid light source for emitting a first color light, a solid light source for emitting a second color light, and a solid light source for emitting a third color light, wherein primary optical axes of these three solid light sources are parallel with each other, said solid light sources are arranged on the same plane surface in such a manner that lines connecting the light sources form a triangle, and said three solid light sources are arranged on a single cooling plate;

an optical system for introducing to light valves each light in respective colors from each solid light source of said illuminating device; and an image light combining means for combining image lights in respective colors obtained as a result of passing through said light valves, wherein said image light combining means has a cuboid shape, and said light valves are arranged to be faced with three side surfaces out of four side surfaces of the cuboid shape.

10. A projection type video display, comprising:

a illuminating device comprising:

a solid light source for emitting a first color light, a solid light source for emitting a second color light, and a solid light source for emitting a third color light, wherein primary optical axes of these three solid light sources are parallel with each other, said solid light sources are arranged on the same plane surface in such a manner that lines connecting the light sources form a triangle, said three solid light sources are arranged on a single cooling plate, and said cooling plate is formed with fins;

an optical system for introducing to light valves each light in respective colors from each solid light source of said illuminating device; and an image light combining means for combining image lights in respective colors obtained as a result of passing through said light valves, wherein said image light combining means has a cuboid shape, and said light valves are arranged to be faced with three side surfaces out of four side surfaces of the cuboid shape.

\* \* \* \* \*